United States Patent [19]

Burchett

[11] 4,326,491
[45] Apr. 27, 1982

[54] FUEL HEATER

[76] Inventor: Lawrence R. Burchett, 10330 Manor Rd., Leawood, Kans. 66206

[21] Appl. No.: 115,198

[22] Filed: Jan. 25, 1980

[51] Int. Cl.$^3$ ............................................. F02M 31/00
[52] U.S. Cl. .................................... 123/557; 123/552; 165/51
[58] Field of Search ................... 123/557, 552; 165/51, 165/52

[56] References Cited

U.S. PATENT DOCUMENTS

| | | | |
|---|---|---|---|
| 1,300,600 | 4/1919 | Giesler | 123/552 |
| 1,623,074 | 4/1927 | Tartrais | 123/557 |
| 2,139,777 | 12/1938 | Skok | 123/552 |
| 3,913,543 | 10/1975 | Richard | 123/557 |
| 3,986,486 | 10/1976 | Rabbiosi | 123/557 |
| 3,989,019 | 11/1976 | Brandt | 123/557 |
| 4,072,138 | 2/1978 | Hawkins | 123/557 |
| 4,146,002 | 3/1979 | Quinn | 123/557 |
| 4,180,036 | 12/1979 | Wolf | 123/557 |

Primary Examiner—Ronald H. Lazarus
Attorney, Agent, or Firm—Fishburn, Gold and Litman

[57] ABSTRACT

A fuel heater is provided for internal combustion engines utilized on motorized vehicles and utilizing a fuel stored as a liquid. The fuel passes through a frusto-conically shaped coil within a heat exchanger wherein heat is transferred thereto from engine heated cooling fluid which enters the exchanger tangentially and exits axially therefrom. Flow of the fluid through the exchanger is controlled by the speed of the water pump and by an ambient temperature sensitive valve. Preferably, there is also a restriction device for the liquid which sets an initial temperature therein which temperature after setting is generally maintained by cooperation between the pump and the ambient temperature sensitive valve.

7 Claims, 4 Drawing Figures

FUEL HEATER

BACKGROUND OF THE INVENTION

The present invention relates to a liquid fuel preheater for internal combustion engines, in particular to such a preheater utilizing a relatively simple yet highly effective mechanism for maintaining a relatively uniform temperature of the fuel entering the engine even when external conditions or fuel consumption change dramatically.

It is well recognized in the art that preheating of gasoline prior to combustion in an engine of a motorized vehicle increases the efficiency of the heated gasoline as compared to non-preheated gasoline. One theory proposed for this increased efficiency is that with preheating more of the energy of combustion can be utilized to cause expansion of the gases in the combustion chamber, thus increasing the power produced as opposed to such energy being used to heat the liquid fuels to vaporization temperatures.

Many prior art devices have been utilized to preheat gasoline and other liquid fuels; however, in general, each such device has had the disadvantage of either being insensitive to changes in ambient temperatures and/or fuel usage or have been relatively complicated and therefore subject to high maintenance and failure while also being relatively expensive.

The present invention on the other hand is relatively sensitive to changes in external conditions or fuel usage and basically requires only already existing equipment for controlling the temperature of the gasoline.

SUMMARY OF THE INVENTION

Therefore, the principal objects of the present invention are: to provide a liquid fuel preheater which is sensitive to changes in ambient temperature and fuel consumption and is used in conjunction with an internal combustion engine; to provide such a preheater utilizing heated cooling fluid from the engine as a heating medium; to provide such a preheater in which flow of the heated fluid to the preheater is partially determined by the speed of the water pump, thereby making the fluid flow generally proportional or sensitive to fuel consumption, and also partially by an engine thermostat in conjunction with an internal space heater control thermostat, thereby making the fluid flow generally sensitive to external temperature conditions; to provide such a preheater including restrictive means to initially set the desired temperature of the fuel exiting the preheater; to provide such a preheater including a concurrent shell and tube heat exchanger; to provide such an exchanger wherein the fuel passes through a frusto-conically shaped tube; to provide such an exchanger wherein the fluid enters one end of the shell tangentially and exits the other end of the shell axially, thereby maximizing heat transfer in a relatively small volume; to provide such an exchanger which is capable of an extended useful life, is relatively inexpensive to produce, is relatively maintenance free, and is particularly well adapted for the proposed use.

Other objects and advantages of this invention will become apparent from the following description taken in connection with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE PREFERRED EMBODIMENT

Figure 1:
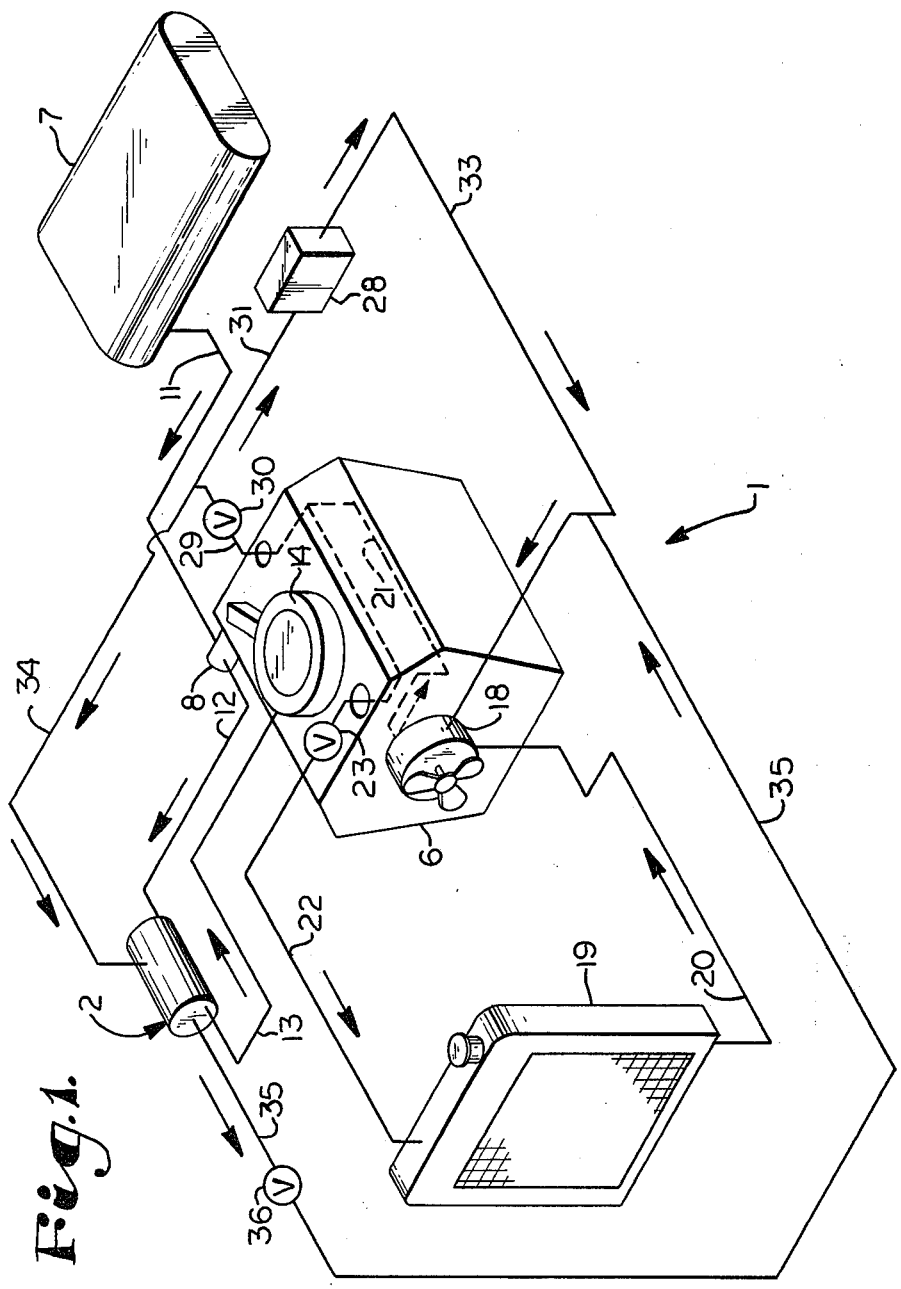
FIG. 1 is a schematic view of an engine, fuel system and cooling system for a motorized vehicle including a fuel heater according to the present invention.

As required, detailed embodiments of the present invention are disclosed herein; however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

The reference numeral 1 generally designates a power supply source for a self-propelled vehicle in combination with a fuel heater 2 according to the present invention.

The power system 1 includes an internal combustion engine 6, a fuel tank 7, and pump means such as a fuel pump 8. Fuel flows from storage in the fuel tank 7 to the fuel pump 8 through a conduit 11 and therefrom to the fuel heater 2 through a conduit 12. From the heater 2 the fuel flows through conduit 13 to a carburetor including an air intake 14 associated with the engine 6. The conduit 13 may also be suitably insulated.

The fuel may be any suitable material for use in internal combustion engines such as gasoline, diesel fuel, alcohol or the like and is normally in a liquid state while in storage in the fuel tank 7 and during passage thereof through the fuel pump 8.

The engine 6 also includes a cooling means mechanism or system comprising fluid pump means such as cooling fluid pump 18 and an air cooled radiator 19. Cooling fluid such as water or a combination of water and antifreeze is stored in and flows through the radiator such that the fluid becomes cooled by ambient air also flowing through the radiator. The cooling fluid flows out of the radiator 19 through a conduit 20 into the fluid pump 18. The cooling fluid is pressurized in and flows out of the water pump 18 through a conventional channel 21 within the engine 6 wherein the fluid becomes heated by and thus cools the engine 6. A portion of the cooling fluid then flows back to the radiator through conduit 22 after being heated in the engine 6. Flow through the conduit 22 is regulated by a conventional thermostat or similar temperature regulating means or valve 23. The cooling system also includes a space heater 28 for the interior temperature control of a vehicle. A portion of the heated cooling fluid exiting the engine flows through a conduit 29 to throttling means such as valve 30 and therefrom through a conduit 31 to the heater 28. The valve 30 may be manually or automatically controlled by a conventional temperature control device associated therewith so as to regulate the interior temperature of the vehicle. In most conventional vehicles a slight manual movement of the interior temperature control mechanism will open the valve 30 a sufficient amount such that the heated cooling fluid will flow from the engine 6 through the valve 30. The cooling fluid exits the space heater 28 through the conduit 33.

A portion of the heater cooling fluid passing through the valve 30 also flows through a conduit 34 to the fuel heater 2. From the fuel heater 2 the cooling fluid, after passing therethrough, flows within the conduit 35 through restricting means such as valve 36 and rejoins the cooling fluid coming from the space heater 28 in the conduit 33 so as to enter the suction of the cooling fluid pump 18. The valve 36 is preferably a manually operated control valve, although an orifice or the like would also provide restriction of the fluid flow.

Both the fuel pump 8 and the cooling fluid pump 18 are coordinated by gearing or the like with the speed of the engine 6, such that as the engine speed varies, the flow of fuel and cooling fluid also varies respectively in substantially proportional amounts. The thermostat 23 maintains a generally constant temperature within the cooling fluid exiting the engine 6.

Figure 2:
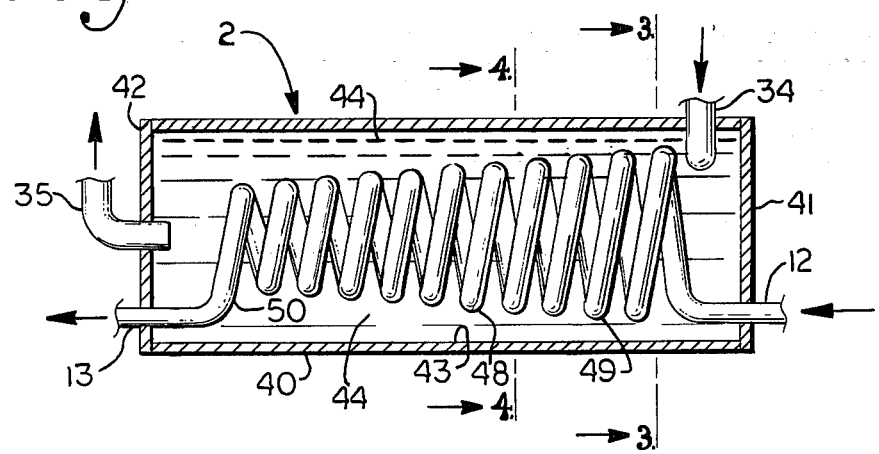
FIG. 2 is an enlarged cross-sectional view of a heat exchanger portion of the fuel heater.
Figure 3:
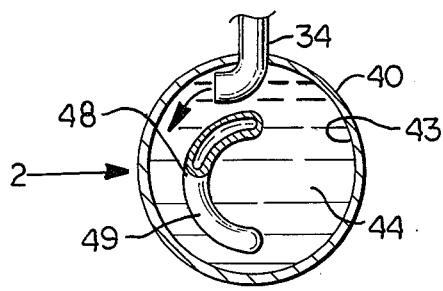
FIG. 3 is a cross-sectional view of the heat exchanger taken along line 3—3 of FIG. 2.
Figure 4:
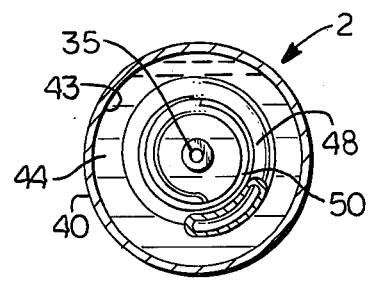
FIG. 4 is a cross-sectional view of the heat exchanger taken along line 4—4 of FIG. 2.

As is best seen in FIGS. 2, 3 and 4, the fuel heater 2 comprises a heat exchanger having an annular shaped shell 40 through which the fuel and heated cooling fluid flow in segregated regions. Plates or walls 41 and 42 are secured by welding or the like to and seal opposite ends of the tube 40 so as to form a chamber 43 for retaining the cooling fluid 44. The cooling fluid 44 enters the chamber 43 through conduit 34 which enters thereinto near the end wall 41. Preferably, the cooling fluid 44 enters somewhat tangentially to and near the interior surface of the shell 40, as is illustrated in FIG. 3. The cooling fluid 44 exits the chamber 43 through the conduit 35 which is positioned so as to communicate with the chamber through the end wall 42 opposite the cooling fluid inlet. Preferably, the cooling fluid 44 exits the chamber substantially along the axis of the shell 40. The tangential entry and axial exit of the cooling fluid 44 is believed to improve circulation of the cooling fluid 44 through the chamber 43, thus providing a relatively fast response to changes in fuel consumption, fuel temperature or cooling fluid flow.

Positioned interior of the chamber 43 is a coil 48 connected at opposite ends thereof to the fuel conduits 12 and 13, such that fuel will flow therethrough. The coil is a helically wound tube having a conical or frustoconical shape and having a wider end 49 and a narrower end 50. The the coil 48 is preferably coaxial with the shell 43. The coil wider end 49 is positioned near the cooling fluid inlet conduit 34 such that the cooling fluid and fuel both enter the fuel heater 2 near the same end thereof and circulate first about the coil wider end 49. The coil narrower end 50 is near the exit of both the fuel and the cooling fluid 44 from the fuel heater 2. Preferably, the coil wider end 49 approaches the diameter of the interior shell 40. As is illustrated in FIG. 2, the fuel conduits 12 and 13 enter and exit respectively the chamber 43 through the end walls 41 and 42 respectively.

It is noted that the fuel heater 2 is normally positioned between the fuel pump 8 and the engine 6 to avoid vapor lock of the former.

In use, the fuel heater 2 produces a relatively constant temperature within the fuel delivered to the engine 6 by means of relatively simple and pre-existing control mechanisms. In particular, the fuel heater 2 is interconnected with an automotive system 1, such as is shown in FIG. 1. Upon initially starting the engine system 1 after installation of the fuel heater 2 therein, the engine 6 is allowed to run for sufficient time so as to idle at a relatively constant state, that is the cooling fluid temperature exiting the engine along with other engine temperatures approach fairly constant values. At this point the valve 36 between the fuel heater 2 and the cooling fluid pump 18 is opened slightly so as to allow flow of the heated cooling fluid 44 from the engine 6 to flow through conduits 29 and 34 into the fuel heater 2. (The valve 30 must also be automatically or manually opened at least a sufficient amount to allow cooling fluid flow therethrough.) The temperature of the fuel exiting the fuel heater 2 is monitored by a pyrometer or the like, and the valve 36 is adjusted so as to provide a predetermined temperature of the fuel exiting the heater 2 through the conduit 13. Preferably, when the fuel is gasoline of a premium grade, the temperature is adjusted to approximately 140° F. to 160° F., with 150° F. being the normal target. The optimum temperature varies with the type and grade of fuel; however, normally it is desired that the fuel reach the carburetor 14 just slightly cooler than the point of volatility of the fuel. If the fuel is totally vaporized upon entering the carburetor 14, it may inhibit proper action of the carburetor throttle pump on acceleration of the engine 6. After this initial adjustment, the valve 36 is normally not further adjusted, unless the thermostat valve 36 or another major control is modified.

After the temperature of the fuel exiting the fuel heater 2 is adjusted as previously described during a period or state of idle in the engine 6, the fuel heater 2 is then ready for maintaining relatively constant temperature of the fuel during normal operation of the engine 6 (that is, when the engine 6 is warmed up and functioning to propel the vehicle). In general, as the engine 6 increases speed, the fuel pump 8 also increases the flow of fuel to the engine 6 basically in proportion to the increase in speed of the engine 6. Therefore, more fuel is passing through the fuel heater 2 and proportionally greater heat is required to provide a constant temperature in the fuel exiting the fuel heater 2. As the speed of the engine 6 increases, the cooling fluid pump 18 also increases substantially in proportion to the speed of the engine 6 and, therefore, the cooling fluid passing through the engine 6 is also increased in proportional amounts provided the engine has reached a warmed-up state. Given any particular opening of the valve 30 and constant engine speed, the flow through the conduit 29 of the heated cooling fluid exiting the engine 6 will be relatively constant. The portion of the flow of the cooling fluid exiting the engine 6 that passes through the vehicle space heater 28 or the fuel heater 2 will be basically determined by the position of the valve 36 which is, as has been described, preset. Therefore, provided that the valve 30 and the valve 36 remain at a constant opening, the flow of cooling fluid to the fuel heater 2 and/or to the interior heater 28 will be substantially proportional to the speed of the engine 6. In this manner, as the engine speed and, thus, the fuel consumption increase, the flow of the heated cooling fluid into the fuel heater 2 also increases, so as to exchange heat to hence maintain a substantially constant temperature in the fuel exiting the fuel heater 2. The same effect occurs when the engine slows down, that is, the fuel consumption and the flow of heated cooling fluid entering the fuel heater 2 decreases.

Flow of heated cooling fluid through the heater 2 is also preferably controlled to respond to changes in ambient temperature which would create a change in the temperature of the fuel entering the fuel heater 2 and thus require more or less heat input to maintain a constant temperature of the fuel exiting the fuel heater 2. Therefore, means are provided to vary the flow of the heated cooling fluid into the fuel heater 2, according to changes in the ambient temperature. In the illustrated embodiment shown in FIG. 1, the ambient temperature control means or throttling valve comprises a temperature control valve 30 which is regulated by conventional manual or automatic devices to control interior temperature of the vehicle by means of heat delivered through the space heater 28. Thus, as ambient temperature decreases, the valve 30 opens further to allow heated cooling fluid to flow through the space heater 28 and vice versa.

It has been found that this opening and closing of the valve 30, whether manually or automatically controlled, substantially compensates for changes in the ambient temperature and thus modifies the flow of heated cooling fluid into the fuel heater 2 such that the temperature of the fuel exiting the fuel heater 2 will remain at a relatively constant temperature, even though the temperature of the fuel entering the fuel heater 2 varies.

Thus, there is an active cooperation between the controls consisting of the engine thermostat 23, the space heater control valve 30, and the drive of the cooling fluid pump 18 so as to produce sufficient heated cooling fluid to the fuel heater 2 to compensate for changes in ambient temperature and/or fuel consumption and thereby produce a substantially constant temperature within the fuel exiting the fuel heater 2 under relatively all conditions. It is noted, of course, that the original setting of the restriction valve 36 is also important in determining a fuel temperature; however, the setting of the valve 36 normally will not be varied.

The configuration of the fuel heater 2 and flow of the cooling fluid and fuel therethrough are such as to maximize heat exchange within a relatively short period and with relatively little fuel within the fuel heater 2. In this manner, the chance of overheating a large amount of the fuel on stopping or during idle is greatly reduced, yet the fuel heater 2 is still quickly responsive to sudden changes in speed or fuel temperature.

It has been found that the temperature control systems described above will for most vehicles control the temperature of the fuel within 10 degrees of a desired or preferred temperature and often will control the temperature within even a smaller range. Testing of vehicles utilizing the fuel heater 2 demonstrated improved mileage for a given amount of fuel in comparison to the same vehicle without the fuel heater 2 under substantially equivalent driving conditions.

It is to be understood that while certain embodiments of the present invention have been described and shown herein, it is not to be limited to specific forms or arrangement of parts herein described and shown.

Having thus described the invention, what is claimed and desired to secure by Letters Patent is:

1. A fuel heating system in combination with an internal combustion engine utilizing the fuel for powering a motorized vehicle; said vehicle including a cooling mechanism wherein cooling fluid is recirculated through the engine and a fuel pump means for pumping the fuel from storage to the engine; said fuel heating system comprising:
(a) a heat exchanger having said fuel flowing therethrough and said fuel receiving heat therein;
(b) said heat exchanger being flow connected with a flow path of said fuel between said pump means and said engine;
(c) said heat exchanger also having said fluid flowing therethrough after being heated by said engine; said fluid and said fuel being separated so as not to mix;
(d) engine thermostat means for controlling the temperature of said fluid after flowing through and being heated by said engine operating under normal conditions;
(e) cooling fluid pump means controlling flow of fluid through said engine in association with said thermostat; said cooling fluid pump means under normal operating conditions varying flow of said fluid through said engine in approximate proportion to use of said fuel which is in approximate proportion to speed of the engine;
(f) regulating means controlling flow of said fluid through said heat exchanger in cooperation with said cooling fluid pump means and being responsive to ambient air temperature;
(g) whereby under constant ambient air temperature said heated fluid at a substantially constant temperature flows into said heat exchanger in approximate proportion to said fuel and thereby heats said fuel to a relatively constant temperature and flow of said heated fluid increases as ambient air temperature decreases and decreases as ambient air temperature increases thereby maintaining a relatively constant temperature in said fuel prior to entry thereof into said engine, wherein:
(h) said heat exchanger is a concurrent shell and tube type with said fuel flowing through said tube and said fluid flowing through said shell about said tube; and
(i) said tube comprises a frusto-conical shaped helix.

2. The system according to claim 1 wherein:
(a) said vehicle includes an internal space heater having a temperature control device associated therewith;
(b) said regulating means comprises the internal heater temperature control device of said vehicle; and
(c) fluid flow to said heat exchanger exits said engine with fluid flow to said heater and diverges therefrom after passing through a thermostatic valve for said internal heater.

3. The system according to claim 1 including:
(a) selectively adjustable restricting means positioned so as to restrict flow of said fluid out of said heat exchanger; whereby said fluid temperature may be selectively adjusted.

4. The system according to claim 3, 1 or 2 wherein:
(a) said coil is widest at the end thereof whereat said fuel enters said heat exchanger.

5. The system according to claim 4 wherein:
(a) said fluid tangentially enters and axially exits said shell.

6. A fuel preheater for a vehicle having a fuel burning engine, a fuel pump for delivery of said fuel from storage to said engine, fluid for cooling said engine and coolant pump means for pumping said fluid; said preheater comprising:

(a) a concurrent shell and tube heat exchanger wherein:
(b) said fuel flows through said tube and said fluid after being heated in said engine flows through said shell around said tube;
(c) said tube comprises a frusto-conical shaped coil having a wide end positioned near a first end whereat said fuel enters said heat exchanger;
(d) said heated fluid enters said heat exchanger near said first end;
(e) said fluid enters said heat exchanger substantially near said first end and tangentially to said shell; and
(f) said fluid exits said heat exchanger near the end opposite said first end.

7. The preheater according to claim 6 wherein:
(a) said coil is substantially concentric with the axis of said shell; and
(b) said fluid exits said shell substantially near the axis of said shell.

* * * * *